Patented May 10, 1949

2,469,819

UNITED STATES PATENT OFFICE 2,469,819

VULCANIZATION OF RUBBER COMPOSITIONS

Paul J. Flory, Kent, and Norman Rabjohn, Akron, Ohio, assignors to Wingfoot Corporation, Akron, Ohio, a corporation of Delaware No Drawing. Application January 16, 1946, Serial No. 641,652

5 Claims. (Cl. 260—768)

This invention relates to new methods of curing rubber and more specifically to methods of hardening and insolubilizing rubber without heat, or at temperatures substantially lower than those customarily used.

The purpose of this invention is to provide improved methods of curing or vulcanizing rubber compositions. It is customarily desirable to fabricate rubber by molding or otherwise forming it in the tractable uncured state and subsequently curing the formed article. Where the rubber composition involves perishable structures of paper, wax or certain synthetic resins, so that usual curing temperatures may not be used, this invention finds a valuable application. Further, the carefully controlled operations used in curing rubber necessitate expensive and elaborate installations of furnaces, molds and temperature-measuring instruments. By the practice of this invention, rubber articles may be fabricated in the customary manner and the cure subsequently effected by merely storing the article at room temperature or in a moderately heated storeroom, thus eliminating the necessity for elaborate equipment and avoiding the use of high temperatures.

This invention is useful in curing all types of rubber, including natural latices and coagula, e. g., those of Hevea braziliensis, which are capable of further chemical reactions owing to the presence of residual olefinic groupings. The expression "a rubber containing residual olefinic groupings," as used herein, also includes synthetic rubbers which are polymers of polyolefines or copolymers of the polyolefines and other polymerizable monomers. Polyolefines suitable for the preparation of such rubbers are the conjugated hydrocarbon diolefins and their halogen derivatives, such as butadiene-1,3, isoprene, chloroprene, other alkyl or halogen substituted derivatives of butadiene-1,3, and higher polyenes, such as triolefine hydrocarbons. The polyolefin may be used in very small proportions in the mixture of unpolymerized monomers, for example, 0.5 to 5 per cent, as in Butyl rubber, or in larger proportions, such as 50 to 80 per cent, as in Buna N or Buna S synthetic rubbers. The conjugated diolefin may also be used to the extent of 100 per cent of the polymerizable monomer as in polychloroprene or polyisoprene. The diolefin may be copolymerized with any polymerizable mono olefinic compound with which it is compatible, including styrene, acrylonitrile, vinyl acetate, the alkyl acrylates and the corresponding alpha-alkyl- or halo-acrylates, vinylidene chloride, isobutylene, alkyl fumarate, alkyl maleate, polymerizable homologues thereof and other polymerizable monomers capable of forming interpolymers with the conjugated diolefins.

In this specification the term "Butyl rubber" is used to refer to the synthetic rubber composition made by the polymerization of small proportions of a conjugated diene hydrocarbon with a substantially larger proportion of an iso-olefine containing a single olefine linkage. The Butyl rubbers are prepared from such proportions of monomers that about 0.25 per cent to 8 per cent of the reacting monomers is the conjugated diolefine. The preferred iso-olefines are isobutylene and its alkyl substituted derivatives while the preferred polyenes are butadiene-1,3, and isoprene. The Butyl rubbers may contain minor proportions of other polymerizable monomers besides the polyenes and the iso-olefines, for example styrene. Butyl rubbers are well known in the rubber industry and widely used in applications where gas impervious compositions are desired.

"Buna S" and "Buna N" are commercial synthetic rubbers, the former being a copolymer of 50 to 80 per cent of butadiene-1,3 and 20 to 50 per cent of styrene and the latter a copolymer of 50 to 80 per cent of butadiene-1,3 and 20 to 50 per cent of acrylonitrile.

The invention involves mixing the rubber composition with a polyazo ester having the structural formula

in which R' is a monovalent hydrocarbon radical, oxahydrocarbon radical, thiahydrocarbon radical, or the corresponding halo- or nitro-substituted radicals, R is a multivalent hydrocarbon radical, oxahydrocarbon radical, thiahydrocarbon radical, or the corresponding halo- or nitro-substituted radicals, and $x$ is a small whole number greater than one and preferably between 2 and 5 inclusive.

The monovalent radical designated as R' in the above structural formula may be an alkyl radical, such as methyl, ethyl, hexyl, cetyl and melissyl radicals, an aryl radical such as phenyl and naphthyl radicals, an aralkyl radical, such as benzyl, phenylethyl and naphthylmethyl radicals, a cycloalkyl radical, such as cyclohexyl and cyclopentyl, an alkoxyalkyl radical, such as 2-methoxyethyl, 2-ethoxyethyl, and the 2-isopropoxy-n-propyl, an alkoxyaryl radical, such as methoxyphenyl and ethoxynaphthyl radicals, a thiahydrocarbon radical, such as ($C_2H_5$—S—$C_2H_4$—), and the corresponding alkyl-, halo-, and nitro-substituted radicals, such as 2-chloroethyl, 3-bromopropyl, fluoromethyl, parachlorophenyl, meta - ethyl - phenyl, tolyl, xylyl, 2-nitro-phen oxymethyl, and 2,4-dinitrobenzyl radicals.

The multivalent radical designated as R in the above structural formula may by any alkylene radical, such as ethylene, hexamethylene, decamethylene, and 1,2-propylene radicals, the oxaalkylene radicals such as the radical
(—$C_2H_4$—O—$C_2H_4$—)
derived from diethylene glycol, the radical
(—$C_2H_4$—O—$C_2H_4$—O$C_2H_4$—)
derived from triethylene glycol, and the corresponding thia-alkylene radicals, an arylene radical, such as para-phenylene, and the various naphthylene radicals, a divalent radical having both aryl and aliphatic characteristics, such as tolylene

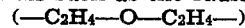

toluylene

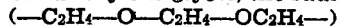

xylylene

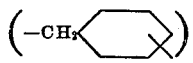

diphenylene methane

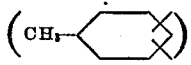

and 2,2 bis(diphenylene) propane

the oxahydrocarbon and thiahydrocarbon radicals corresponding to the above radicals, the alkyl-, halo- and nitro substituted derivatives of any of the above radicals, a radical having a valence greater than two, such as glyceryl, pentaerythryl (the quadrivalent radical derived from pentaerythritol and similar aliphatic or aromatic hydrocarbon, thiahydrocarbon, oxahydrocarbon and the corresponding alkyl-, halo-, and nitro-substituted radicals.

The new polyazo esters are prepared by reacting a polychlorocarbonate of a polyhydroxy derivative having the desired multivalent radical of the type above described with an ester of hydrazine monocarboxylic acid wherein the carboxylate radical is linked to the desired monovalent radical of the types described above, and subsequently reacting the hydrazo ester thereby formed with a suitable oxidizing agent for the purpose of converting it to the corresponding polyazo derivative.

The polychlorocarbonates are prepared by reacting any polyhydroxy compound involving the desired polyvalent radical, as above described, with phosgene until all of the hydroxyl radicals, or at least a plurality of the hydroxyl radicals, are substituted with chlorocarbonate radicals

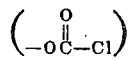

The polychlorocarbonates are preferably prepared by adding the polyhydroxy compound gradually to an excess of liquid phosgene while maintaining a temperature below 10° C. for the purpose of removing the heat of reaction, as well as to retain the phosgene in liquid state. It is desirable to surmount the reaction flask with a reflux condenser cooled to the liquefying temperature of phosgene for the purpose of condensing the phosgene gas and returning the same to the reaction vessel. Some of the polychlorocarbonates may be purified by distillation, although many can be satisfactorily purified by washing with water and warming to remove excess phosgene and hydrogen chloride.

The preparation of polychlorocarbonates from polyhydroxy compounds having hydroxyl groups attached directly to aryl rings should be conducted in the presence of a basic reagent, such as a tertiary amine or an oxide, hydroxide or carbonate of an alkali or an alkali earth metal.

The esters of hydrazine monocarboxylic acid may be prepared by reacting hydrazine hydrate with the carbonic acid ester having the monovalent organic radical desired in the final composition. Thus, diphenyl carbonate, diethyl carbonate, dibenzyl carbonate and any other carbonate ester may be reacted with an equal molecular proportion of hydrazine hydrate. The reaction takes place immediately, although generally it is desirable to stir the reaction mass and heat it slightly to complete the reaction. The resulting ester is usually a solid which can be separated from the reaction mass by adding water and subsequently recrystallized from alcohol solutions.

The condensation of the polychlorocarbonate with the esters of hydrazine monocarboxylic acid is conducted in solution in a suitable solvent, such as dioxane, and in the presence of a basic reagent, such as triethylamine, pyridine or other tertiary amine or the oxides, carbonates, or hydroxides of an alkali or an alkali earth metal. The resulting polyhydrazo ester may then be separated by adding water to the reaction mixture and purified by recrystallization from ethyl acetate.

The polyhydrazo esters may then be oxidized to the corresponding polyazo compounds by means of concentrated nitric acid or other oxidizing agents. The oxidation reaction is exothermic but the application of heat may be necessary to start the oxidation. Once the reaction has begun, it soon becomes very vigorous and should be controlled by pouring the reaction mass on ice or into cold water. The resulting polyazo compound can be separated from the cooled reaction mass by extracting with benzene or ether and purified by washing with dilute sodium bicarbonate solutions and with water, followed by drying in the presence of anhydrous sodium sulfate. The solvent may then be removed by evaporation, leaving the substantially pure polyazo compound.

The following are examples of compounds which may be used in the practice of this invention:

Decamethylene-bis(ethyl azodicarboxylate)
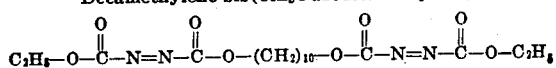

Diethyleneglycol-bis(phenyl azodicarboxylate)
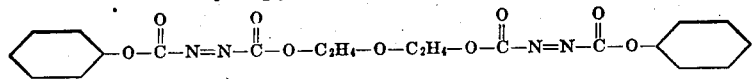

Glyceryl-tris(benzyl azodicarboxylate)
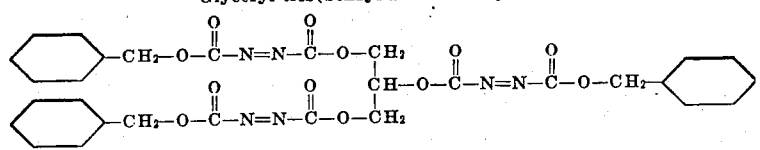

Para-phenylene-bis(cyclohexylazo dicarboxylate)
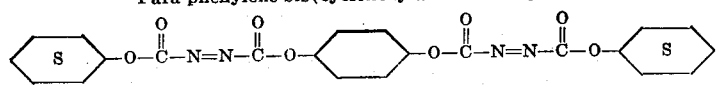

Thiodiethylene-bis(gamma-chloropropylazo dicarboxylate)
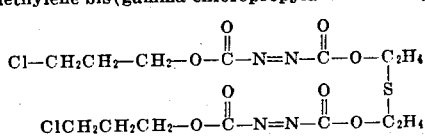

Para xylylene-bis(beta-methoxyethyl-azo dicarboxylate)
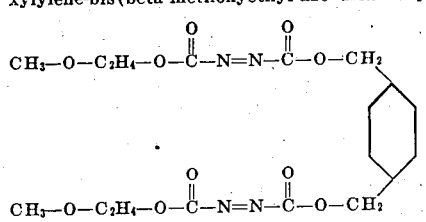

2,2-(p,p'-di(hydroxyphenyl) propane bis(p-nitro phenyl azo dicarboxylate) ester
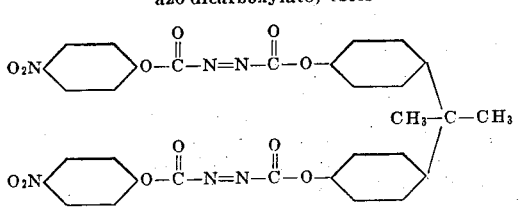

In accordance with this invention any synthetic or natural rubber composition containing residual ethylenic unsaturation may be mixed with the polyazo esters of the type described and subsequently cured by allowing the compositions to stand at room temperature or by subjecting them to slight or moderate temperatures. In general, the temperatures required are substantially below those usually used to cure rubber compositions in the presence of sulfur, or other conventional vulcanization agents. The curing action which proceeds at room temperature will be accelerated by slight or moderate heating.

The polyazo esters may be added in any manner customarily used in the rubber industry. For example, the compositions may be added and mixed into the rubber composition on an ordinary roll mill, preferably a cooled mill to prevent the setting of the composition during the milling operation. The polyazo esters may also be added to the latex prior to coagulation. Similarly, the modified latex may be used in that form for coating operations, manufacture of sponge compositions, or any of the conventional methods of using rubber latices. The new curing agents may also be added to solutions of rubbers and the cements so prepared used in coating, cloth, paper and metal surfaces or as adhesives in bonding rubber or rubber-coated surfaces. The vulcanizing agents are also useful in preparing rubber articles by gelation techniques or by any other conventional rubber processing methods.

The new curing agents may be used to cure the surface of molded or shaped rubber articles by preparing a solution of the polyazo compound in benzene, or other solvent for the uncured rubber, and painting the rubber surface therewith. Thin rubber coatings may be substantially completely cured by this method due to the penetrating effect of the benzene which carries the polyazo compounds into the interior of the rubber article. This painting technique may also be used to splice parts of uncured rubber by contacting the joined rubber parts at the joint with the solution of polyazo ester and holding the joint in position until the solution penetrates the rubber and the polyazo esters effect the cure.

Further details of the practice of this invention are set forth in the following specific examples.

Example 1

A cement was prepared by dissolving 5 percent by weight of natural crude rubber in benzene. Diethylene glycol bis(methyl azodicarboxylate) was thereafter added to the benzene solution and dissolved therein to the extent of about 1.0 mole percent of the rubber computed as $C_5H_8$. The solution was then spread evenly on a smooth glass surface and dried for 2 hours at 50° C. The rubber film so obtained was transparent and colorless and exhibited a tensile strength of 2800 pounds per square inch and an elongation of 1000 percent.

Example 2

The procedure of Example 1 was repeated except that a copolymer of 95 percent styrene and 5 percent isoprene was used in place of natural rubber. The resulting cured film was insoluble in benzene.

Example 3

A latex of a copolymer of 65 percent butadiene-1,3 and 35 percent styrene containing 57 percent solids was shaken with 5 percent by weight of hexamethylene bis(ethyl-azo-dicarboxylate) until a uniformly mixed composition was obtained. The modified latex was poured into molds and allowed to stand at room temperature for 20 hours. A partial cure was noticeable at that time. The samples were completely cured by heating at 50° C. for four hours.

Example 4

A 200 gram sample of Butyl rubber was thoroughly mixed with 12 grams of dipropylene bis(ethylazodicarboxylate) on a cold roll mill. One half of the mixture was milled with an additional 100 grams of Butyl rubber. The two samples containing respectively approximately 6 and 3 percent of the azo-ester both showed evidence of curing on the mill. Test strips became fully cured in 30 minutes when subjected to a temperature of 250° F.

*Example 5*

Gelation tests were conducted with several bis-azo esters by mixing 25 cc. of an 8 percent solution of natural smoked rubber in benzene with each of several 10 cc. benzene solutions of the bis-azo dicarboxylates as indicated below. The samples were heated in a water bath at 75° C. The following table demonstrates the effect of several different polyazo esters and the period of time required to set the rubber to a gel.

| Compound | Minutes |
| --- | --- |
| Hexamethylene glycol bis(ethyl azo dicarboxylate) | 65 |
| Diethylene glycol bis(ethyl azo dicarboxylate) | 45 |
| Decamethylene glycol bis(ethyl azodicarboxylate) | 80 |

Although the invention is described with respect to several specific examples it is not intended that the details thereof shall be construed as limitations on the scope of the invention except to the extent incorporated in the following claims.

We claim:

1. A method of vulcanizing a rubber composition which comprises reacting an unvulcanized rubber containing residual olefinic groupings with a compound having the structural formula

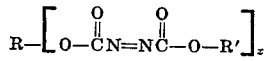

in which R' is a monovalent radical of the group consisting of hydrocarbon radicals, oxahydrocarbon radicals, thiahydrocarbon radicals, and the corresponding halo- and nitro-substituted radicals, R is a multivalent radical of the group consisting of hydrocarbon radicals, oxahydrocarbon radicals, thiahydrocarbon radicals, and the corresponding nitro- and halo-substituted radicals, the oxygen atoms being connected to a carbon atom in R and R', and x is a small whole number between 2 and 5 inclusive.

2. A method of vulcanizing a rubber composition which comprises reacting natural rubber with a compound having the structural formula

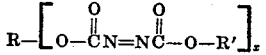

in which R' is a monovalent radical of the group consisting of hydrocarbon radicals, oxahydrocarbon radicals, thiahydrocarbon radicals, and the corresponding halo- and nitro-substituted radicals, R is a multivalent radical of the group consisting of hydrocarbon radicals, oxahydrocarbon radicals, thiahydrocarbon radicals, and the corresponding nitro- and halo-substituted radicals, the oxygen atoms being connected to a carbon atom in R and R', and x is a small whole number between 2 and 5 inclusive.

3. A method of vulcanizing butadiene-1,3-styrene rubber which comprises reacting the unvulcanized rubber with a compound having the structural formula

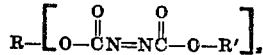

in which R' is a monovalent radical of the group consisting of hydrocarbon radicals, oxahydrocarbon radicals, thiahydrocarbon radicals, and the corresponding halo- and nitro-substituted radicals, R is a multivalent radical of the group consisting of hydrocarbon radicals, oxahydrocarbon radicals, thiahydrocarbon radicals, and the corresponding nitro- and halo-substituted radicals, the oxygen atoms being connected to a carbon atom in R and R', and x is a small whole number between 2 and 5 inclusive.

4. A method of vulcanizing butadiene-1,3-acrylonitrile rubber which comprises reacting the unvulcanized rubber with a compound having the structural formula

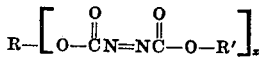

in which R' is a monovalent radical of the group consisting of hydrocarbon radicals, oxahydrocarbon radicals, thiahydrocarbon radicals, and the corresponding halo- and nitro-substituted radicals, R is a multivalent radical of the group consisting of hydrocarbon radicals, oxahydrocarbon radicals, thiahydrocarbon radicals, and the corresponding nitro- and halo-substituted radicals, the oxygen atoms being connected to a carbon atom in R and R', and x is a small whole number between 2 and 5 inclusive.

5. A method of vulcanizing a rubber composition which comprises mixing an unvulcanized rubber containing residual olefinic groupings with a compound having the structural formula

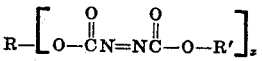

in which R' is a monovalent radical of the group consisting of hydrocarbon radicals, oxahydrocarbon radicals, thiahydrocarbon radicals, and the corresponding halo- and nitro-substituted radicals, R is a multivalent radical of the group consisting of hydrocarbon radicals, oxahydrocarbon radicals, thiahydrocarbon radicals, and the corresponding nitro- and halo-substituted radicals, the oxygen atoms being connected to a carbon atom in R and R', and x is a small whole number between 2 and 5 inclusive, and heating to effect a vulcanization of the rubber.

PAUL J. FLORY.
NORMAN RABJOHN.

REFERENCES CITED

The following references are of record in the file of this patent:

UNITED STATES PATENTS

| Number | Name | Date |
| --- | --- | --- |
| 2,170,191 | Fisher | Aug. 22, 1939 |